United States Patent
Sterling et al.

(10) Patent No.: US 7,580,997 B2
(45) Date of Patent: Aug. 25, 2009

(54) STATE RECOVERY

(75) Inventors: Keith Sterling, London (GB); Richard Hughes, London (GB); Allan Jenkins, London (GB); William Box, London (GB); Ian Middleton, London (GB)

(73) Assignee: Jacobs Rimell Limited, London (GB)

( * ) Notice: Subject to any disclaimer, the term of this patent is extended or adjusted under 35 U.S.C. 154(b) by 688 days.

(21) Appl. No.: 10/492,551

(22) PCT Filed: Oct. 15, 2002

(86) PCT No.: PCT/GB02/04667

§ 371 (c)(1),
(2), (4) Date: Apr. 14, 2004

(87) PCT Pub. No.: WO03/034223

PCT Pub. Date: Apr. 24, 2003

(65) Prior Publication Data

US 2005/0044239 A1    Feb. 24, 2005

(30) Foreign Application Priority Data

Oct. 15, 2001 (GB) ............................... 0124702.2

(51) Int. Cl.
*G06F 15/173* (2006.01)
(52) U.S. Cl. .............. 709/224; 709/227; 709/228; 700/1; 700/5; 700/12; 711/100; 711/5; 711/111
(58) Field of Classification Search .......... 709/224.227, 709/228, 224, 227; 714/100, 15; 715/100, 715/15; 711/100, 5, 111; 700/1, 5, 12
See application file for complete search history.

(56) References Cited

U.S. PATENT DOCUMENTS

| | | | |
|---|---|---|---|
| 4,716,524 A | 12/1987 | Oxley et al. | |
| 5,001,479 A | 3/1991 | Becker et al. | |
| 5,289,460 A * | 2/1994 | Drake et al. | 370/245 |
| 5,987,621 A * | 11/1999 | Duso et al. | 714/4 |
| 6,088,773 A * | 7/2000 | Kano et al. | 711/161 |
| 6,625,750 B1 * | 9/2003 | Duso et al. | 714/11 |
| 6,859,841 B2 * | 2/2005 | Narad et al. | 709/236 |

FOREIGN PATENT DOCUMENTS

| | | |
|---|---|---|
| EP | 0584512 | 6/1997 |
| GB | 2252475 | 8/1992 |
| GB | 2281986 | 3/1995 |
| JP | 19860621 61134852 | 6/1986 |

OTHER PUBLICATIONS

British Patent Office, Search Report of priority application No. GB 0124702.2, Jul. 9, 2002.

* cited by examiner

*Primary Examiner*—Nathan J Flynn
*Assistant Examiner*—Mohammad A Siddiqi
(74) *Attorney, Agent, or Firm*—Zilka-Kotab, PC

(57) ABSTRACT

A method of recovering the state of a system, which system comprises at least one counter, which counter represents an instantaneous state of an entity in a system. The counter will increase in value in response to an increment request and decrease in value in response to a decrement request, wherein each increment request is paired with a decrement request.

15 Claims, 2 Drawing Sheets

STATE RECOVERY

CROSS-REFERENCE TO RELATED APPLICATIONS

The present application is a national stage filing of PCT International Application No. PCT/GB02/04667 filed on Oct. 15, 2002, and further claims priority to GB Application No. 0124702.2 filed on Oct. 15, 2001.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The invention relates to a method of recovering the modeled state of a system.

2. Description of Related Art Including Information Disclosed under 37 CFR 1.97 and 1.98

In many electronic systems it is necessary to provide a framework to facilitate the storage of state information derived from monitoring entities within an external system. An example where this might be required is in a transaction based system with a high request inter-arrival rate such as that of monitoring a number of users logged on to a computer network.

In such systems, the problems of modeling the system and the state of the system are non-trivial. One approach that is used is to model the system using state counters associated with individual entities within the system, representing for example, the usage of the entity at any one instant in time. The required operations on these counters simply comprise increment and decrement requests.

Typically, in transaction based systems which have a high request inter-arrival rate, the option of storing this data in non-volatile memory can be dismissed due to the lengthy access times. Therefore volatile memory is the only option. However, in using volatile memory there is the risk that all state information will be lost in the case of a system failure of the monitoring system.

One known approach to the recovery of state information in a transaction based system, where one or more counters represent the correct, instantaneous state of the monitored system, when a failure of the monitoring application occurs and the state counters are lost, is to reset all the counters to zero, implicitly accepting that all the previous state data is lost and unrecoverable. The monitoring operation then continues as before and the counters are adjusted in response to incoming transaction requests.

The known approach suffers from the problem that the system will receive decrement requests which relate to the initial state before failure. However, the appropriate counters should not be decremented as they will tend to a negative value, thus misrepresenting the correct, instantaneous state of the monitored system. This occurs since there will be decrement requests received relating to increment requests received during the initial state. The problem with this is that the current state counters have no knowledge of what the state of the system was in the initial state. Therefore, any decrement requests received relating to increment requests received during the initial state will be deducted from the current state counters incorrectly.

BRIEF SUMMARY OF THE INVENTION

The present invention seeks to provide a method of recovering the modeled state of a system.

According to the invention there is provided a method of recovering the state of a system, which system comprises at least one counter, which counter represents an instantaneous state of an element in the system, whereby the counter will increase in value in response to an increment request and decrease in value in response to a decrement request, wherein each increment request is paired with a decrement request.

The method of the invention advantageously pairs the increment and decrement requests. This permits the system in the recovery state to distinguish between known decrement requests, i.e. those corresponding to increment requests received in the recovery state, and unknown decrement requests, i.e. those corresponding to increment requests received in initial state. The unknown decrement requests can be discarded and hence have no effect on the recovery state. The counters will then tend to converge with the true state of the system.

In a preferred embodiment, the increment and decrement requests are paired using an index key shared between the increment and decrement requests. Preferably the system comprises a plurality of counters. Preferably the or each counter refers to a user session. Preferably, the state of the or each counter is held in volatile memory comprising a part of the system.

BRIEF DESCRIPTION OF THE SEVERAL VIEWS OF THE DRAWING(S)

An exemplary embodiment will now be described in greater detail with reference to the drawing, in which.

DETAIL DESCRIPTION OF EXEMPLARY EMBODIMENTS OF THE INVENTION

Figure 1:
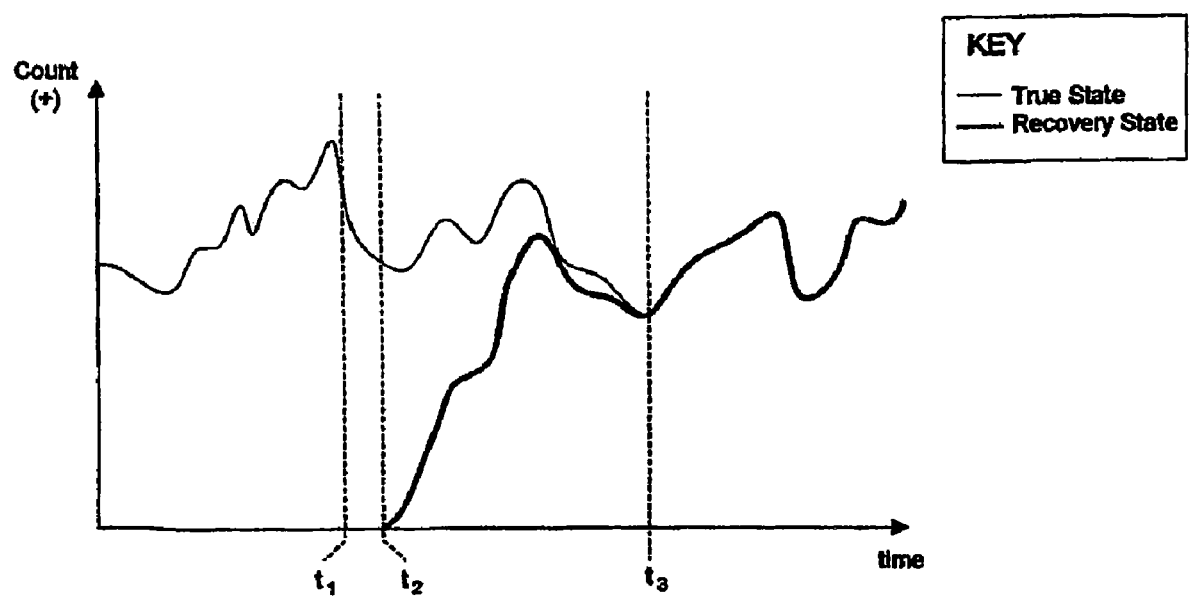
FIG. 1 shows a graph of the state of a single counter.

A typical application where the monitoring of the state of a system is in the field of concurrency control such as a connection to an internet service provider or online licensing and gaming applications. FIG. 1 shows a graph showing the state of a single counter over a period of time. The counter can refer to a number of user sessions, such as a dialed up connections to an internet service provider. However, it is also possible to group individual users if this is appropriate so that a counter refers to all users in a particular geographic region or all users belonging to the same organization. The former is applicable in the case of a vISP and the latter in the case of a corporate contract.

The period from t=0 to $t_1$ represents the initial state of the system, where $t_1$ represents the time at which the monitoring system fails. $t_2$ represents the time at which the system recovers and begins to process increment and decrement requests. $t_3$ represents the time at which the recovery state represents the true state of the system being monitored, the time between $t_2$ and $t_3$ representing the recovery state. The thin line represents the true state of the system and the bold line represents the recovery state. The time $t_3$ will be reached once all of the decrement requests relating to increments from the initial state have been processed.

Figure 2:
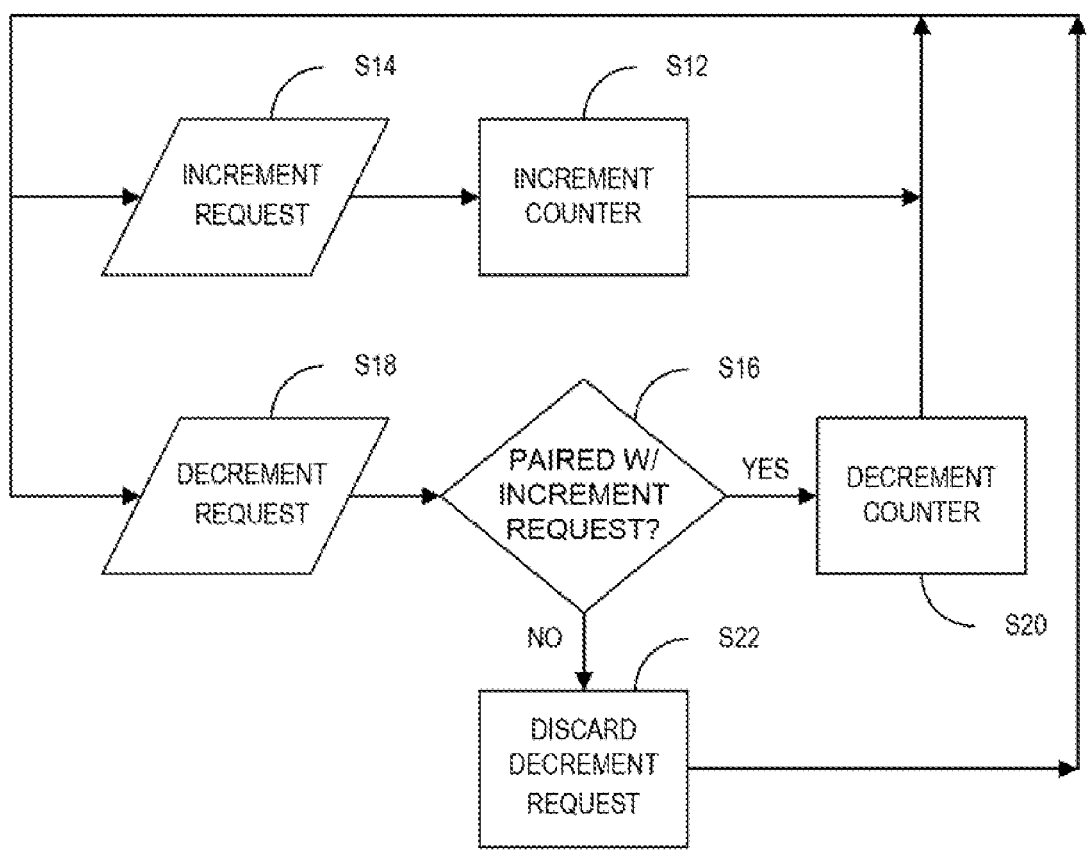
FIG. 2 is a flow chart of an exemplary method according to the invention.

FIG. 2 shows an exemplary method 10 according to the invention, including the steps of S12 incrementing a counter in response to S14 receiving an increment request to increment a modeled state of an entity; and S16 determining if a decrement request is paired with an increment request received subsequent to the recovery of an entity monitoring application, in response to S18 receiving a decrement request to decrement the modeled state of the entity. If it is determined that the decrement request is paired with such an increment request, then the next step is S20 decrementing the counter. However, if it is determined that the decrement request is not paired with such an increment request, then the next step S22 is discarding the decrement request such that the decrement request has no effect on the counter. The steps S12 and S16 are repeated in response to S14 receiving an increment request and S18 receiving a decrement request, respectively, so that the modeled state of the entity converges with a true state of the entity as all decrement requests not paired with an increment request received subsequent to the recovery of the entity monitoring application are processed. The period while the modeled state and true state are converging is the "recovery state."

One method of pairing increment and decrement requests is to use a shared index key between increment and decrement requests associated with the usage of a particular entity, which can be defined in the data model of the system. Other methods of pairing increment and decrement requests are possible depending on the language and data constructs used in the implementation.

In addition to user sessions, it is possible for the counters to refer to other forms of user activity such as number of accesses to a piece of content or to a certain application or the volume of data transferred.

The invention claimed is:

1. A method of recovering a modeled state of an entity in a distributed networked system following failure and recovery of an entity monitoring application, which said entity monitoring application comprises a counter, which said counter represents the modeled state of the entity in the system, comprising the steps of:
    (a) incrementing the counter in response to receiving an increment request to increment the state of the entity;
    (b) determining, in response to receiving a decrement request to decrement the state of the entity, if the decrement request is paired with an increment request received subsequent to the recovery of the entity monitoring application, and:
    if so, then decrementing the counter; and
    if not, then discarding the decrement request such that the decrement request has no effect on the counter; and
    (c) repeating steps (a) and (b) such that the modeled state of the entity converges with a true state of the entity as all decrement requests not paired with the increment request received subsequent to the recovery of the entity monitoring application are discarded;
    wherein the counter refers to a number of concurrent user sessions;
    wherein the counter is implemented in volatile memory;
    wherein the system comprises a plurality of entities and the entity monitoring application comprises a plurality of counters corresponding to the plurality of entities.

2. The method according to claim 1, wherein the increment and decrement requests are paired using an index key shared between the increment and decrement requests.

3. The method according to claim 1, wherein the modeled state of the entity is in the field of concurrency control.

4. The method according to claim 3, wherein the concurrency control includes a connection to an internet service provider.

5. The method according to claim 3, wherein the concurrency control includes a connection to an online licensing application.

6. The method according to claim 3, wherein the concurrency control includes a connection to a gaming application.

7. The method according to claim 1, wherein the user sessions include connections to an internet service provider.

8. The method according to claim 1, wherein the counter refers to all users in a particular geographic location.

9. The method according to claim 1, wherein the counter refers to all users belonging to the same organization.

10. The method according to claim 1, wherein the counter refers to a number of accesses to a piece of content.

11. The method according to claim 1, wherein the counter refers to a number of accesses to an application.

12. The method according to claim 1, wherein the counter refers to a volume of data transferred.

13. The method according to claim 2, wherein the increment request and the decrement request are associated with the usage of a particular entity.

14. The method according to claim 2, wherein the index key shared between the increment and decrement requests is defined in a data model.

15. A system, comprising:
    a counter implemented in volatile memory;
    logic for incrementing the counter in response to receiving an increment request to increment the state of the entity;
    logic for determining, in response to receiving a decrement request to decrement the state of the entity, if the decrement request is paired with an increment request received subsequent to the recovery of an entity monitoring application, and
    if so, then decrementing the counter; and
    if not, then discarding the decrement request such that the decrement request has no effect on the counter; and
    logic for repeating the incrementing and the determining such that the modeled state of the entity converges with a true state of the entity as all decrement requests not paired with the increment request received subsequent to the recovery of the entity monitoring application are discarded;
    wherein the counter refers to a number of concurrent user sessions;
    wherein the system comprises a plurality of entities and the entity monitoring application comprises a plurality of counters corresponding to the plurality of entities.

* * * * *